(12) United States Patent
Bergman et al.

(10) Patent No.: US 8,744,376 B2
(45) Date of Patent: Jun. 3, 2014

(54) METHOD AND APPARATUS FOR SUPPORTING UPLINK TRANSMIT DIVERSITY

(75) Inventors: Johan Bergman, Stockholm (SE); Johan Hultell, Solna (SE); Niklas Johansson, Uppsala (SE); Erik Larsson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/501,103

(22) PCT Filed: Sep. 24, 2010

(86) PCT No.: PCT/SE2010/051032

§ 371 (c)(1),
(2), (4) Date: Apr. 10, 2012

(87) PCT Pub. No.: WO2011/053220

PCT Pub. Date: May 5, 2011

(65) Prior Publication Data

US 2012/0202555 A1    Aug. 9, 2012

Related U.S. Application Data

(60) Provisional application No. 61/251,032, filed on Oct. 13, 2009.

(51) Int. Cl.
*H03C 7/02* (2006.01)
*H04L 1/02* (2006.01)

(52) U.S. Cl.
USPC .............................. 455/101; 455/69; 375/267

(58) Field of Classification Search
USPC ........... 455/101, 102–103, 115.1, 115.3, 126, 455/132–134, 137, 69, 67.11, 63.1; 370/280, 204, 480, 206, 344, 332; 375/267, 299, 347, 346
See application file for complete search history.

(56) References Cited

U.S. PATENT DOCUMENTS

| 6,778,507 | B1 * | 8/2004 | Jalali .............................. 370/317 |
| 7,321,636 | B2 * | 1/2008 | Harel et al. ................... 375/299 |
| 7,379,759 | B2 * | 5/2008 | Nakaya et al. ............. 455/562.1 |
| 7,406,060 | B2 * | 7/2008 | Periyalwar et al. ........... 370/328 |
| 7,583,982 | B2 * | 9/2009 | Olesen et al. .............. 455/562.1 |

(Continued)

FOREIGN PATENT DOCUMENTS

| WO | 2009/020903 A2 | 2/2009 |
| WO | 2009/078529 A1 | 6/2009 |

OTHER PUBLICATIONS

Astely, D. et al. "LTE: The Evolution of Mobile Broadband." IEEE Communications Magazine, Apr. 2009, pp. 44-51.

*Primary Examiner* — Pablo Tran
(74) *Attorney, Agent, or Firm* — Murphy, Bilak & Homiller, PLLC (57) ABSTRACT

The present invention relates to a method and a user equipment for use in a wireless communication system that allow for improved uplink transmit diversity performance by using downlink measurements for making informed decisions on whether or not to change precoding vector for uplink transmission. The user equipment measures (32) downlink characteristics, such as received power, on a plurality of antennas of the user equipment. Based on the measured downlink characteristics a precoding vector for unlink transmission is determined (38). The determined precoding vector is then used to perform uplink transmission (31).

22 Claims, 3 Drawing Sheets

(56) References Cited

U.S. PATENT DOCUMENTS

| | | | |
|---|---|---|---|
| 7,853,216 B1* | 12/2010 | Breslin et al. | 455/67.11 |
| 7,884,763 B2* | 2/2011 | Na et al. | 342/377 |
| 8,134,503 B2* | 3/2012 | Na et al. | 342/370 |
| 8,233,559 B2* | 7/2012 | Ko et al. | 375/267 |
| 8,325,846 B2* | 12/2012 | Ko et al. | 375/267 |
| 8,380,143 B2* | 2/2013 | Yang et al. | 455/114.3 |
| 8,437,792 B2* | 5/2013 | Malladi et al. | 455/522 |
| 8,467,363 B2* | 6/2013 | Lea et al. | 370/338 |
| 8,477,801 B2* | 7/2013 | Sridhara et al. | 370/448 |
| 8,520,569 B2* | 8/2013 | Periyalwar et al. | 370/310 |
| 8,537,790 B2* | 9/2013 | Cudak et al. | 370/337 |
| 8,553,589 B2* | 10/2013 | Hui et al. | 370/279 |
| 8,619,542 B2* | 12/2013 | Mondal et al. | 370/208 |
| 8,634,488 B2* | 1/2014 | Lee et al. | 375/267 |
| 2002/0145968 A1* | 10/2002 | Zhang et al. | 370/206 |
| 2003/0002594 A1 | 1/2003 | Harel et al. | |
| 2005/0143113 A1* | 6/2005 | Lee et al. | 455/522 |
| 2006/0234645 A1* | 10/2006 | Lin et al. | 455/69 |
| 2008/0123602 A1* | 5/2008 | Beek et al. | 370/336 |
| 2010/0054353 A1* | 3/2010 | Roh et al. | 375/260 |
| 2010/0246516 A1* | 9/2010 | Pelletier et al. | 370/329 |
| 2010/0265853 A1* | 10/2010 | Song et al. | 370/280 |
| 2010/0284359 A1* | 11/2010 | Kim et al. | 370/329 |

* cited by examiner

Fig. 5

METHOD AND APPARATUS FOR SUPPORTING UPLINK TRANSMIT DIVERSITY

TECHNICAL FIELD

The present invention relates to uplink transmit diversity in a wireless communications system, and in particular to methods and arrangements for providing support for improved performance in connection with uplink transmit diversity.

BACKGROUND

Currently the Third Generation Partnership Project (3GPP) is evaluating the potential benefits of uplink transmit (Tx) diversity in the context of High-Speed Uplink Packet Access (HSUPA). With uplink transmit diversity user equipments (UEs) that are equipped with two or more transmit antennas are capable of utilizing all of them for uplink transmissions. This is achieved by multiplying a UE output signal s(t) with a set of complex pre-coding weights $w_i$, where i=1 ... N with N denoting the number of transmit antennas. The rationale behind uplink transmit diversity is to adapt the pre-coding weights so that user and network performance is maximized. Depending on UE implementation the antenna weights may be associated with different constraints. Within 3GPP two classes of transmit diversity are considered:

Switched antenna transmit diversity, where the UE at any given time-instance transmits from one of its antennas only. Thus if $w_i \neq 0$, $w_j=0$ for all $j \neq i$.

Beamforming where the UE at a given time-instance can transmit from more than one antenna simultaneously. By means of beamforming it is possible to shape an overall antenna beam in the direction of a target receiver.

While switched antenna transmit diversity is possible for UE implementations with a single power amplifier (PA) the beam forming solutions may require one PA for each transmit antenna.

Switched antenna transmit diversity can be seen as a special case of beamforming where one of the antenna weights is 1 (i.e. switched on) and the antenna weight of any other antenna of the UE is 0 (i.e. switched off).

A fundamental idea behind uplink transmit diversity is to exploit variations in the effective channel to improve user and network performance. The term effective channel here incorporates effects of transmit antenna(s), transmit antenna weights, receiving antenna(s), as well as the wireless channel between transmitting and receiving antennas. Selection of appropriate antenna weights is crucial in order to be able to exploit the variations in the effective channel constructively. Furthermore timing of changes in antenna weights is important. When the antenna weights changes the effective channel as perceived by a receiving base station, such as a Node-B, may change abruptly. For instance, in a case of switched antenna transmit diversity with two antennas, if a UE starts transmitting on antenna 2 instead of antenna 1 then the corresponding antenna weights $w_1/w_2$ will change from 1/0 to 0/1 in an instant. As a result previous channel estimates become out of date, which may lead to worse effective signal-to-interference ratio (SIR) at the Node-B and packet errors until channel estimates have been updated and the Node-B has adjusted its channel estimates to reflect the new channel. Hence it is beneficial to avoid unnecessary changes of antenna weights or antenna switches.

It has been decided in 3GPP, as mentioned in 3GPP Tdoc RP-090987, 3GPP Work Item Description Uplink Tx Diversity for HSPA, to investigate uplink transmit diversity techniques for HSPA that do not require any newly standardised dynamic feedback signalling between network and UE. According to some suggested schemes the UE should monitor Transmission Power Control (TPC) commands received on the feedback channel F-DPCH (Fractional Dedicated Physical Channel) to select antenna weights. The F-DPCH is an already existing feedback channel and TPC commands is feedback information that is already transmitted for purposes of uplink transmit power control. For example, if a UE operating with switched antenna transmit diversity receives a large number of consecutive TPC UP commands on F-DPCH from the serving cell, the UE may conclude that it is likely to be beneficial to switch to another antenna for transmission.

SUMMARY

An object of the present invention is to provide a method and apparatus that provide support for improved performance in connection with uplink transmit diversity.

The above stated object is achieved by means of a method and a user equipment according to the independent claims.

A first embodiment of the invention provides a method for uplink transmit diversity in a user equipment of a wireless communications system. According to the method downlink characteristics on a plurality of antennas of the user equipment is measured. Thereafter a pre-coding vector to be used for uplink transmission is determined based on the measured downlink characteristics. In a further step of the method uplink transmission is performed using the determined pre-coding vector.

A second embodiment of the invention provides a user equipment for use in a wireless communications system supporting uplink transmit diversity. The user equipment comprises a plurality of antennas for uplink and downlink transmission. The user equipment is configured to measure downlink characteristics on a plurality of antennas of the user equipment. Furthermore the user equipment is configured to determine a pre-coding vector to be used for uplink transmission based on the measured downlink characteristics. The user equipment is also configured to perform uplink transmission using the determined pre-coding vector.

An advantage of the embodiments described above is that they allow for informed decisions on which pre-coding vector to use for uplink transmission Thus it is made possible to avoid unnecessary changes of pre-coding vector for uplink transmission. Accordingly some embodiments of the invention provide for improved robustness for uplink transmit diversity operation.

Another advantage is that the embodiments above may be used in connection with different uplink transmit diversity techniques. Examples of different uplink transmit diversity techniques are switched antenna transmit diversity and beamforming.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

In this description several of the exemplary embodiments of the invention presented focus on switched antenna transmit diversity. It is however to be noticed that the present invention is not limited to switched antenna diversity. Embodiments of the present invention can be applied also in connection with uplink transmit diversity in the form of beamforming. In beamforming a signal is transmitted from a number of transmit antennas simultaneously with appropriate weighting. A precoding vector includes transmission antenna weights for a set of antennas. The antenna weights are associated with a respective transmit antenna. As mentioned above, switched antenna diversity implies that one single antenna at a time is used for transmission. In other words switched antenna diversity implies use of a precoding vector with one transmission antenna weight equal to one, and all remaining transmission antenna weights equal to zero. Furthermore, for simplicity this description of embodiments is mainly concerned with cases with two antennas or antenna elements, but can be readily extended to more antennas or antenna elements (an arbitrary number >2).

As used herein the term "antenna" is interchangeable with the term "antenna element". Therefore when referring herein to a user equipment with multiple antennas this includes user equipment's with a multiple element antenna arrangement.

Some of the embodiments described herein are described in connection with a NodeB. NodeB is a base station or radio base station in WCDMA/HSPA (Wideband Code Division Multiple Access/High-Speed Packet Access). However the present invention is not limited to WCDMA/HSPA. Embodiments of the present invention are also applicable for LTE (Long-Term Evolution). The base station is in LTE referred to as an eNodeB.

Figure 1:
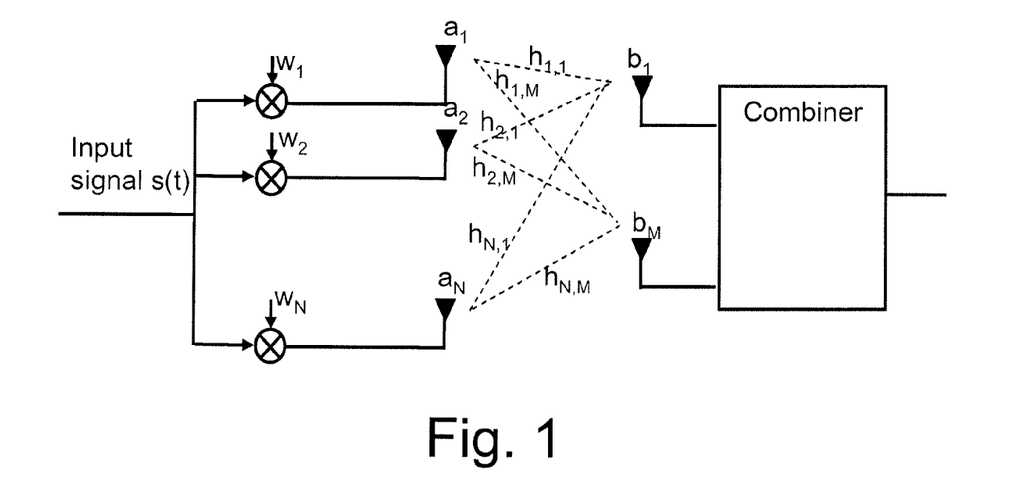
FIG. 1 is a schematic block diagram illustrating transmit diversity in general.

A general case of transmit diversity is illustrated in FIG. 1. An input signal s(t) is transmitted from transmit antennas $a_1, a_2, \ldots, a_N$ using transmission antenna weights $w_1, w_2, \ldots w_N$. The transmissions from the transmit antennas $a_1, a_2, \ldots a_N$ are received by receive antennas $b_1, \ldots b_M$ and fed to a combiner. The paths or links between the respective transmit antennas and the respective receive antennas are denoted $h_{i,j}$, where $i=1, \ldots N$ and $j=1, \ldots, M$.

For switched antenna transmit diversity, an important issue is obviously when to switch antenna, and what information to base this decision on. The current 3GPP study item for UL transmit diversity specifies that introduced transmit diversity (TxD) algorithms should not require any new feedback to be standardized. Consequently, it is of interest to propose transmit diversity algorithms that base their decisions on already available information. One example of such information is TPC UP/DOWN commands transmitted over the F-DPCH, but also other information, such as ACK/NACK feedback could be considered. The TPC commands provide information about the quality of the current transmit-receive (Tx-Rx) link between a UE and Node-B; many consecutive UP commands are likely to mean that a UE is entering a fading dip, whereas many consecutive DOWN commands indicate that the UE is experiencing a fading peak. Note though that the TPC commands will not give any information about any other Tx-Rx link and therefore no knowledge of any conditions that would be experienced when another transmit antenna is used. Nevertheless, when many consecutive UP commands are received it is statistically favourable to switch to the other antenna for transmission (assuming that the fading is independent between the different antenna links or at least not completely correlated). A criteria for when to switch antenna can generally be written as a function of the TPC, f(TPC).

The inventors of the present invention have recognized that a problem with TPC based schemes, as described above, is that no up-to-date information about the other Tx-Rx link(s) is available. For example, it may be so that a second antenna has worse antenna gain (far field antenna radiation pattern) at a current position than a currently used antenna. This can be an effect of different antennas having different and spatially varying antenna diagram properties. For example, the antenna gain might in practice be very low in some directions. Hence, even though the UE receives many consecutive TPC commands UP, it may still be better to continue transmitting on the primary antenna compared to switching the antenna from which transmissions take place, since the gain of the second antenna is smaller than the gain of the primary. Therefore, it would be beneficial to incorporate information about the second Tx-Rx link in a switching decision.

Long term conditions of Tx-Rx links may be deduced from using measurements of the Tx-Rx links on the downlink. Embodiments of the present invention exploit this understanding for decisions on when to change precoding vector for uplink transmit diversity.

In one or more exemplary embodiments a UE autonomously decides transmission antenna weights for an uplink (UL) switched antenna transmit diversity scheme. Accordingly the UE also decides on when to change transmission antenna weights. To select the weights the UE may monitor already existing feedback channels (that are transmitted for other purposes) such as TPC commands on the F-DPCH. For example, several consecutive UP commands can serve as an indicator that it may be favourable to switch antenna. The inventors have realized that if the UE obtains some information about the quality of the other Tx-Rx link (as seen from another antenna which is currently not used for transmission), such information could help in the decision whether to change antenna. A UE according to an exemplary embodiment of the invention uses downlink (DL) measurements in order to get relevant information about the quality of multiple or all of the UL Tx-Rx links (not only the currently used uplink Tx-Rx link). The UL and DL are in general not reciprocal. More specifically, the instantaneous UL and DL channel realizations are generally not reciprocal, whereas long term effects averaged over the fast fading (such as the average received power) are reciprocal or differ by a fixed offset which depends on e.g. the frequency. Consequently, the UE can obtain long term information about the UL by measuring on the DL. There are different types of downlink characteristics that may be measured. It is e.g. possible to measure the average received power on multiple or all antennas of the UE, or to measure the Common Pilot Channel (CPICH) quality at the UE's antennas, to thereby get knowledge about the average gain difference between the two antennas when transmitting. These measurements can be performed/updated whenever the UE receives DL information, e.g. UL related signalling (Enhanced Dedicated Channel Hybrid ARQ Indicator Channel (E-HICH), Enhanced Dedicated Channel Relative Grant Channel (E-RGCH), etc) or DL traffic (High-Speed Shared Control Channel (HS-SCCH) etc), or at some specific measurements periods. In a real situation the different antennas can have very different characteristics, for example different antenna diagrams. This means that one antenna might have much higher gains than the other, and these differences can change over time (or UE position). Consequently, long term effects, such as the average gain difference between different antennas can be very helpful when deciding whether to switch the antenna or precoding vector for UL transmission.

Let us assume an exemplary UE with two antennas where the second antenna has much smaller gain than the primary (currently used) antenna and that the UE receives a number of consecutive TPC UP commands. According to some TPC based schemes this could by default mean that it is decided to switch to the other antenna for UL transmission. However this decision might be erroneous since the other antenna has much worse gain than the primary antenna. A better rule would be to assure that sufficiently many UP TPC commands are received so that any potential antenna gain difference between the primary (currently used for uplink transmission) and secondary antenna are compensated for before switching antenna.

Figure 2:
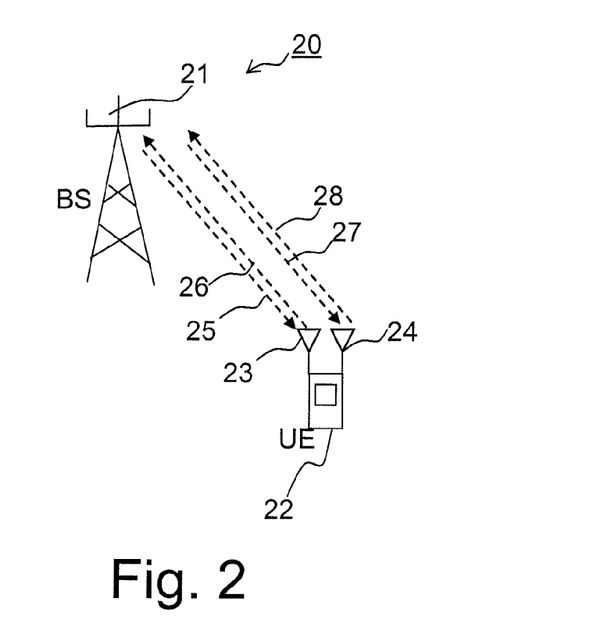
FIG. 2 is a schematic block diagram of a wireless communication system including a user terminal with two antennas.

FIG. 2 illustrates an example of a wireless communication system 20 that support uplink transmit diversity. For the sake of simplicity, only those parts of the wireless communication system that are of particular relevance to the embodiments discussed herein are shown. The wireless communication system comprises a base station 21, such as a NodeB, serving a UE 22. The UE 22 is provided with a primary antenna 23 and a secondary antenna 24. Assuming that switched antenna transmit diversity is applied the base station 21 and the UE 22 may communicate via the primary antenna 23 or via the secondary antenna 24. The NodeB 21 may comprise a plurality of antennas that are used for transmit and/or receive diversity. However for simplicity FIG. 2 illustrates a scenario that corresponds to a case in which the NodeB includes a single antenna. Therefore uplinks and downlinks illustrated in FIG. 2 correspond to a case without transmit or receive diversity in the NodeB. Accordingly FIG. 2 shows a downlink Tx-Rx link 25 with the primary antenna 23 as receive antenna, an uplink Tx-Rx link 26 with the primary antenna 23 as transmit antenna, a down link Tx-Rx link 27 with the secondary antenna 24 as receive antenna and an uplink Tx-Rx link 28 with the secondary antenna 24 as transmit antenna.

According to an example scenario, it is assumed that the primary antenna 23 is used for uplink transmission at time k. An exemplary method can be described as follows:

1) At time k measure a difference in received power $\Delta P_k$ between the two antennas 23, 24:

$$\Delta P_k = P_{primary} - P_{secondary}$$

where, $P_{primary}$, $P_{secondary}$ denote the measured power at the UE on the primary antenna 23, currently used for uplink transmission, and a secondary antenna 24, respectively. Here it is assumed that the UE 22 has two antennas, but this can be generalized to more antennas. Optionally, this measure $\Delta P_k$ may be further filtered:

$$\Delta P_{antenna} = f(\Delta P_s, s=0, \ldots, k)$$

where f( ) is some appropriate function.

2) It is then decided to switch antenna for uplink transmission if $$g(feedback_s, \Delta P_{antenna}, s=0, \ldots, k) > \alpha$$

where g( ) is some appropriate function, feedback may comprise or represent any available and relevant UL feedback information that has been received by the UE at time k. Examples of feedback that may be used in certain embodiments of the described wireless communication system 20 include, but are not limited to TPC commands and ACK/NACK feedback.

A more specific example may be as follows:

a) Map the n last TPC commands to a corresponding UE output power difference. Here UPs and DOWNs typically are the steps in decibels of transmit power that the TPC commands correspond to. Alternatively one could envision a mapping based on interpreting UPs and DOWNs as binary values according to the following formula $$\sum_s (UP_s - DOWN_s) \rightarrow \Delta P_{out}$$

where s corresponds to the last n received TPC commands. Assume for instance that n=15 and that a step used for inner loop power control is 1 dB, such that a TPC UP command corresponds to an order to increase the transmit power with 1 dB and a TPC DOWN command corresponds to an order to decrease the transmit power with 1 dB. If the last 15 received TPC commands included 10 UPs and 5 DOWNs then $\Delta P_{out}=5$ dB, which indicates that it is desired to raise the transmit power with 5 dB.

b) Change antenna for the uplink transmission if $$\Delta P_{out} - \Delta P_{antenna} > \alpha.$$

Assume for instance that received power on the primary antenna 23 and on the secondary antenna 24 have been measured and that it has been determined, based on the measurements that $\Delta P_{antenna}=4$ dB. The difference between $\Delta P_{out}$ and $\Delta P_{antenna}$ is thus 1 dB. If $\alpha=0$ for example, then a switch from the primary antenna 23 to the secondary antenna 24 would be triggered. $\alpha$ is a threshold value that may be predetermined to trigger switches of antenna or precoding vector appropriately. As mentioned above there is a certain cost associated with a switch of antenna or change of precoding vector in that the currently used channel estimate will become out of date which may result in a certain period of lowered performance. $\alpha$ may be chosen to balance this cost against the gain of switching to another antenna/precoding vector, such that the switch is carried out only if the gain is sufficiently high to outweigh the negative effects of the switch. $\alpha$ may also be a parameter which the UE updates based on e.g. measurements of a rate of change of a channel or saved information relating to previous changes of precoding vector. The UE may be configured log the result of precoding vector changes to e.g. avoid too frequent changes. Thus the UE may learn from the logged data and adapt $\alpha$ to a level that does not result in constant antenna switches.

$\Delta P_{out}$ represents an estimate of fast fading or an indication of differences in short term channel quality. $\Delta P_{antenna}$ on the other hand represents an estimate of long term effects and indicates differences in antenna gain. It is the long term effects on the uplink that may be captured by measuring on the corresponding downlink as described above. In the above examples both uplink feedback information and measurements of downlink characteristics were taken into account when deciding when to switch antenna. However according to other embodiments the decision is based solely on downlink measurements.

There are also other aspects that can be considered. UE DL Doppler measurements (i.e. Doppler spread measurements and/or Doppler shift measurements) may be used to decide how often the DL information needs to be updated. Similar, the Doppler measurements can be used to decide the degree of filtering of uplink feedback information filtering, such as TPC filtering, that is suitable or how many consecutive TPC commands that should be combined. In the numeric example described above the last 15 TPC commands were considered in the decision on whether or not switch antenna. But Doppler measurements may be used to adjust the number of TPC commands that are combined. Alternatively, the Doppler measurements can help in deciding how often an antenna switch should occur or is allowed. This would be useful in order to prevent too rapid switches to happen for slowly varying channels. A low Doppler measurement indicates that the channel is changing more slowly. As an alternative to a Doppler measurement one can measure the variations of the DL channel itself since the channel should roughly change equally fast for the UL and the DL.

The solutions presented above can be further elaborated upon. For example it would be beneficial if the UE could inform the base station (e.g. a NodeB) when it decides to change its antenna. This can be done by several means, e.g., by:

- Using some reserved Enhanced Dedicated Channel (E-DCH) Transport Formation Combination Identifier (E-TFCI) values,
- Using a new Dedicated Physical Control Channel (DPCCH) format with a switch indicator bit, or re-interpret a existing bit, e.g. the feedback indicator (FBI) bit,
- Using different pilot sequences depending on which antenna that is used. In this case the NodeB needs to despread the different pilot sequences in parallel.
- A switch is only allowed at certain predefined time instances. In this case the UE does not inform the NodeB about when a switch occurs, but the NodeB has at least some knowledge about when a switch might happen.

An advantage of informing the base station when the UE decides to change antenna or precoding vector is that a period of decreased performance that generally occurs in connection with a change of antenna/precoding vector can be shortened. The base station can e.g. reset the channel filtering estimate and ignore some block errors after being notified of precoding vector change, and may refrain from outer loop power control adjustments.

In one or more other embodiments of the invention, the uplink transmit diversity scheme used is beamforming. In beamforming the UE determines the power difference not between different antennas but between different precoding vectors. A precoding vector is a vector containing the antenna weights used for transmission, that is, wi, where i=1 ... N in FIG. 1. In addition to measuring the received power on each antenna also the covariance between the signals received by different antennas is stored and filtered. This way a covariance matrix R can be created, where the received power for each antenna is on the main diagonal, and the covariance between signals to antenna a1 and a2 is contained in the matrix element of row a1 and column a2. Filtered versions of this covariance matrix R can for many UE types often be assumed to be valid also for the transmit antennas because of the statistical reciprocity property.

The reciprocity property can be explained as follows. When a particular precoding vector is used to transmit a signal through multiple antennas there will be locations in space where the combined signal from the multiple antennas will be relatively stronger. The set of these locations can be said to form a pattern, and hence a particular spatial transmit beam pattern will be constructed for every precoding vector. When a particular precoding vector is used to combine the signals received on multiple antennas a particular receive beam pattern will be constructed in the same way. The reciprocity property is based on the fact that the beam patterns, averaged over the fast fading, are similar for transmit and receive beams even in different frequency bands (as in Frequency Division Duplex mode) if the multiple antennas are closely spaced, which they are in many types of UEs.

One can perform an eigenvalue decomposition of the covariance matrix R into a unitary matrix U and a diagonal matrix S as $R=U*S*U^H$, where $U^H$ denotes the Hermitian or conjugate transpose of the matrix U. The values on the diagonal of the matrix S can be interpreted as relative powers or gains (or losses). The n:th diagonal element of S corresponds to the expected gain (or loss) a signal would experience if it was transmitted using a precoding vector corresponding to the n:th column of the matrix U. In a more general case a precoding vector can be expressed as a linear combination of the columns of U, and the linear combination coefficients can also be used to combine the diagonal elements of S to calculate the relative power or gain (or loss) of this pre-coding vector. This fact can be used to compare how different precoding vectors compare in terms of average power differences. Thus, the methods described above for switched antenna diversity can also be applied for beamforming.

Figure 3A:
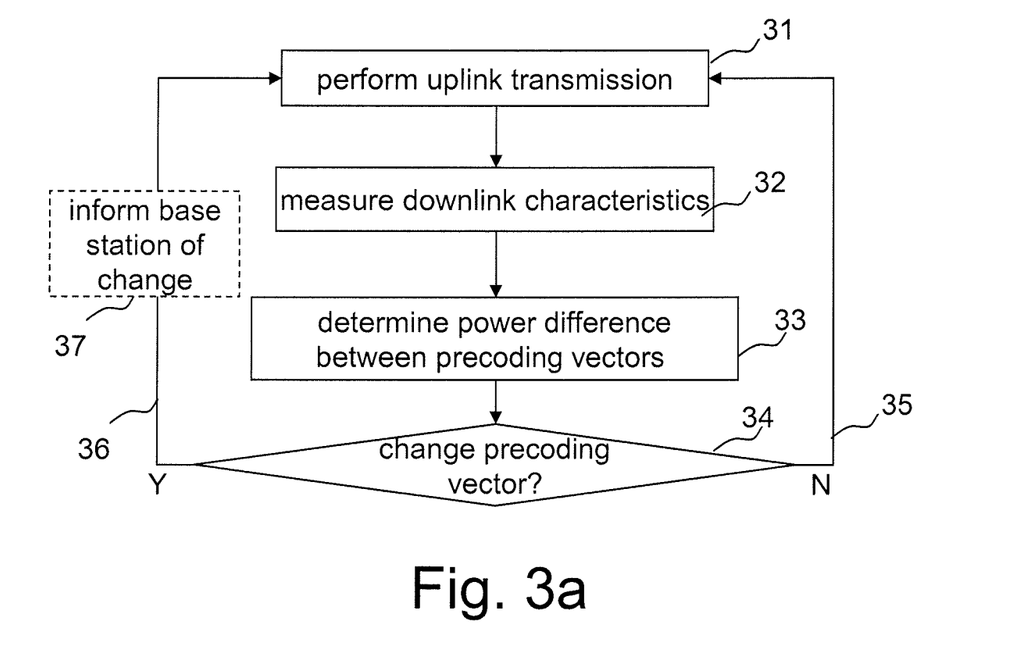
FIGS. 3a and 3b are flow diagrams illustrating alternative methods for uplink transmit diversity.

FIG. 3a is a schematic flow diagram illustrating uplink transmit diversity in a UE according to some embodiments of the solution presented herein. In a step 31 uplink transmission is performed using a first precoding vector. The first precoding vector comprises transmission antenna weights for the respective antennas of the user equipment. Depending on the transmission antenna weights the first precoding vector may control that the uplink transmission is carried out from a single antenna or simultaneously from a plurality of antennas. In a step 32 downlink characteristics on a plurality of antennas of the UE is measured. As discussed above, these measurements may be performed in connection with any downlink information that the UE receives. Based on the measurements of downlink characteristics, the UE determines one or several power differences between the first precoding vector and one or several other precoding vectors in a step 33. The step 33 may include computation of a covariance matrix in the case of beamforming. The power difference(s) may be filtered by means of some function as discussed above. If there are more than two precoding vectors that are to be compared, it is possible that the one with the highest measured gain is selected and that the power difference between the selected precoding vector and the currently used precoding vector is determined thereafter. In a step 34 it is decided whether or not to change precoding vector for uplink transmission based on the power difference(s) determined in step 33. The decision may be made by comparing a function that depends on the power difference(s) to a predetermined threshold value as described above. The function may also depend on received uplink feedback information as mentioned above. If it is decided to not change the precoding vector used for uplink transmission, the method continues with a transition back to step 31 as indicated by arrow 35 and the first precoding vector is used in the uplink transmission. If it is decided to change to a second precoding vector for the uplink transmission, a transition back to step 31 takes place as indicated by arrow 36 and the uplink transmission continues but the second precoding vector is used for the transmission. The base station may optionally be informed of the decision to change or not change precoding vector in a step 37.

Figure 3B:
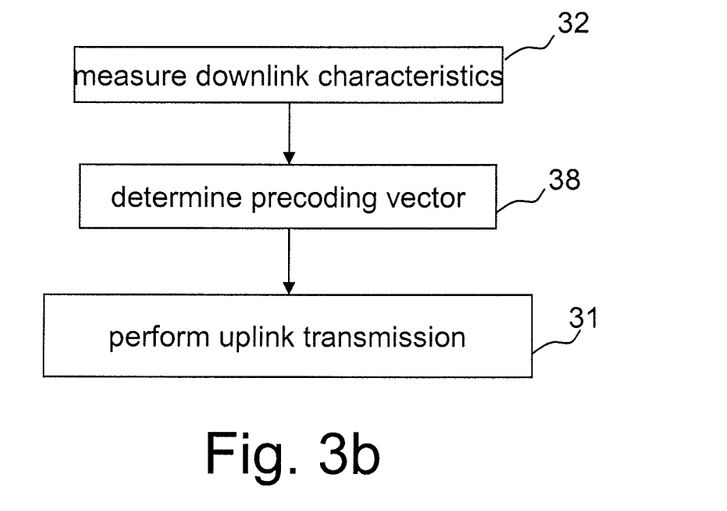

FIG. 3*b* is a schematic flow diagram illustrating uplink transmit diversity in a UE according to some alternative embodiments of the solution presented herein. In the method illustrated in FIG. 3*b* there is not any assumption of an ongoing uplink transmission so the method is applicable for selecting precoding vector for the first transmission. In a step 32 downlink characteristics on a plurality of antennas of the UE is measured. This step corresponds to step 32 as illustrated in FIG. 3*a*. In a step 38 a precoding vector to be used for uplink transmission is determined based on the measured downlink characteristics. Step 38 may include a comparison of a number of different precoding vectors with respect to the expected gain that a signal would experience if it was transmitted using the different precoding vectors respectively, wherein the expected gain is derived from the measured downlink characteristics. Uplink transmission is then performed using the determined precoding vector in a step 31.

Figure 4:
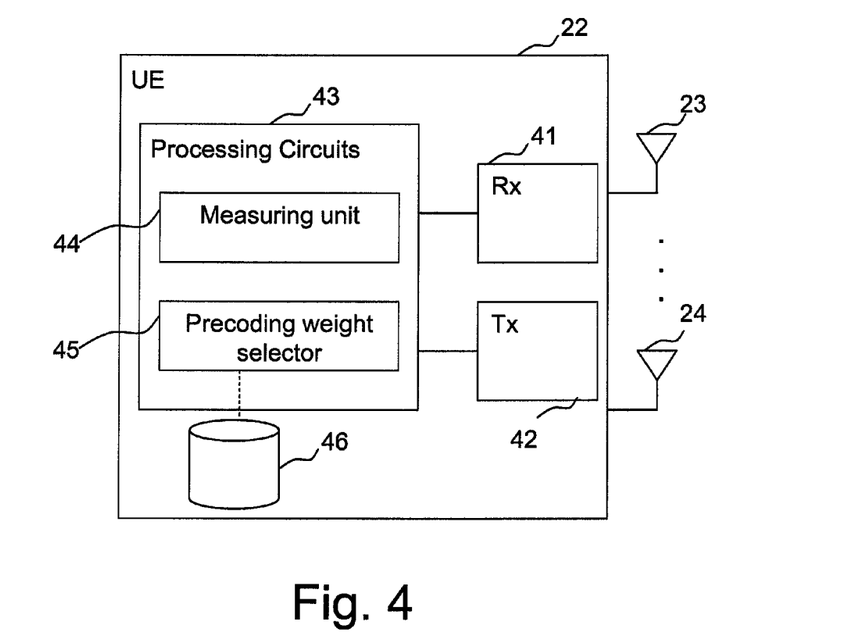
FIG. 4 is a schematic block diagram illustrating an embodiment of a user equipment (UE) configured for uplink transmit diversity.

FIG. 4 is a schematic block diagram of an exemplary embodiment of the UE in FIG. 2. As illustrated in FIG. 4, the UE 22 comprises a primary antenna 23 and a secondary antenna 24, but the UE 22 may also comprise further antennas. The UE includes receiver circuits 41 and transmitter circuits 42. Alternatively the receiver and transmitter circuits may be integrated in a transceiver unit. The transmitter circuits 42 and antennas 23, 24 are particularly configured to perform the step 31 of FIGS. 3*a* and 3*b*. The antennas 23, 23 are also configured for step 32 of FIGS. 3*a* and 3*b*. Processing circuits 43 are provided, which comprise a measuring unit 44, adapted to perform the step 32 of FIGS. 3*a* and 3*b*, and a precoding weight selector, adapted to perform the steps 33, 34 and 38 of FIGS. 3*a* and 3*b*. The UE may also be provided with a memory unit which is adapted to store information related to previous precoding weight selections to e.g. prevent that changes in precoding vector occur too often.

Figure 5:
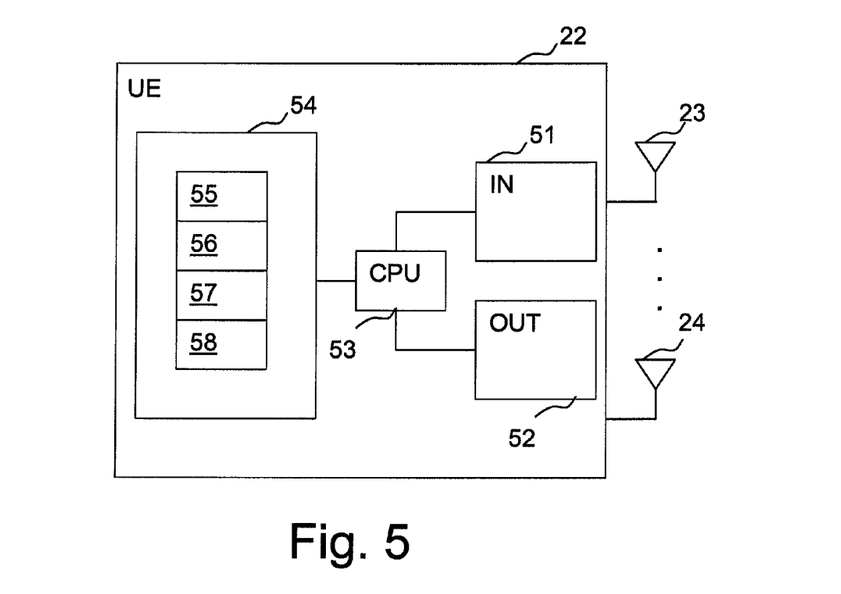
FIG. 5 is a schematic block diagram illustrating an alternative embodiment of a user equipment (UE) configured for uplink transmit diversity.

FIG. 5 is a schematic block diagram of another exemplary embodiment of the UE 22. FIG. 5 may be an alternative description of the exemplary embodiment shown in FIG. 4. The UE 22 comprises antennas 23 and 24. The UE also comprises an input unit 51 which is adapted to receive downlink signals and an output unit 52 for output of uplink signals. The input unit 51 and the output unit 52 may be integrated in hardware of the UE 22. The UE 22 is furthermore provided with a CPU 53, which may be a single unit or composed of several units that are configured to perform steps of procedures described herein. At least one computer program product 54 is included in the UE 22. The computer program product 54 may be embodied in the form of a non-volatile memory, e.g. an EEPROM, a flash memory or a disc drive. The computer program product 54 comprises computer program submodules. FIG. 5 shows a uplink transmission submodule 55 for controlling uplink transmission with a selected precoding vector, a measuring submodule 56 for performing the measuring of the step 32, a determining module 57 for determining a power difference between precoding vectors as in the step 33, and a determining module 58 for determining the precoding vector for uplink transmission. The submodules 55-58 essentially perform the steps 31-34 of the flow diagram of FIG. 3*a* or the steps of the flow diagram of FIG. 3*b*. In other words, when the different submodules 55-58 are run on the CPU 53, the UE performs the steps 31-34 illustrated in FIG. 3*a* or the steps of the flow diagram of FIG. 3*b*. The submodules 55-58 would generally be implemented in software, although implementations completely or partly in firmware, hardware or combinations thereof are also feasible.

From the description above it is apparent that an advantage of embodiments described above is that they allow for informed decisions on whether or not to change precoding vector for uplink transmission. By basing a decision on whether or not to change precoding vector on downlink measurements it is possible to take information about other precoding vectors than the one currently used into account when making the decision. With respect to long-term effects the corresponding UL and DL of an Rx-Tx link are reciprocal. Thus it is made possible to avoid unnecessary changes and increase the uplink transmit diversity performance of the wireless communication system. By measuring downlink characteristics, such as average power differences between different UE antennas and/or the covariance, a more reliable UE decision about precoding vector changes can be made. This will result in improved link and system performance and a more robust network.

Another advantage is that by basing the decision on whether or not to change precoding vector on downlink measurements, no new feedback is required. Certain embodiments discussed above did however combine feedback information that is generally already present, with power difference information derived from the downlink measurements, which allows for more accurate decisions about when to switch antenna or change precoding vector.

A further advantage is that the embodiments above may be used in connection with different uplink transmit diversity techniques. Examples of different uplink transmit diversity techniques are switched antenna transmit diversity and beamforming.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for uplink transmit diversity in a user equipment operating in a wireless communications system having a downlink and an uplink operated in a Frequency Division Duplex (FDD) mode, the method comprising:
   measuring downlink characteristics on each of a plurality of antennas of the user equipment;
   receiving uplink feedback information from the wireless communication network, for one or more uplink transmissions sent from the user equipment using a selected one among a plurality of precoding vectors, each precoding vector comprising transmission antenna weights for the plurality of antennas; and
   determining whether to change from the selected precoding vector to another precoding vector, based on the measured downlink characteristics and the uplink feedback information.

2. The method according to claim 1, wherein measuring the downlink characteristics comprises measuring a received power for each of the plurality of antennas, and wherein the method includes:
   performing uplink transmission using a first precoding vector as the selected precoding vector;
   determining at least one power difference between the first precoding vector and at least one other precoding vector, based on the received powers measured for the plurality of antennas; and
   determining whether or not to change from the first precoding vector to a second precoding vector of said at least one other precoding vector for the uplink transmission based on the determined power difference.

3. The method according to claim 2, wherein it is determined to change from the first precoding vector to the second precoding vector if a predetermined function, which depends on the determined power difference and the uplink feedback information received for the first precoding vector, exceeds a predetermined threshold value.

4. The method according to claim 3, wherein the uplink feedback information comprises received Transmission Power Control, TPC, commands.

5. The method according to claim 3, wherein measuring the downlink characteristics includes performing downlink measurements indicative of a rate of change of a downlink channel and wherein determining whether or not to change from the first precoding vector to a second precoding vector includes using the measurements indicative of the rate of change of the downlink channel in the determination of whether or not to change from the first precoding vector to the second precoding vector.

6. The method according to claim 2, further comprising allowing a change from the first precoding vector to the second precoding vector only at certain predefined time instances.

7. The method according to claim 1, wherein switched antenna transmit diversity is applied in the uplink transmission, such that each precoding vector specifies transmission antenna weights corresponding to transmission from a single antenna respectively and wherein said measured downlink characteristics comprises received power for each antenna.

8. The method according to claim 1, wherein beamforming is applied in the uplink transmission, such that each precoding vector specifies antenna weights corresponding to transmission from one antenna or several antennas simultaneously and wherein said measured downlink characteristics comprise covariances between signals received on the plurality of antennas.

9. The method according to claim 8, wherein said measured downlink characteristics include measurements of received power for each antenna, and wherein determining whether to change from the selected precoding vector to another precoding vector includes
using the covariances and measurements of received power on the plurality of antennas to determine average power differences between different precoding vectors.

10. The method according to claim 1, wherein said measuring of downlink characteristics is performed when the user equipment receives uplink related signaling, when the user equipment receives downlink traffic, or at specific measurement periods.

11. The method of claim 1, wherein determining whether to change from the selected precoding vector to another precoding vector comprises evaluating a function that depends on fast fading or short term channel quality as estimated from the uplink feedback information and depends on long term differences in antenna gain for the plurality of antennas, as estimated from the measured downlink characteristics.

12. A user equipment configured for operation in a wireless communications system that supports uplink transmit diversity and has an uplink and a downlink operated in a Frequency Division Duplex (FDD) mode, wherein the user equipment comprises a plurality of antennas for uplink and downlink transmission and is configured to:
measure downlink characteristics on each of a plurality of antennas of the user equipment;
receive uplink feedback information from the wireless communication network, for one or more uplink transmissions sent from the user equipment using a selected one among a plurality of precoding vectors, each precoding vector comprising transmission antenna weights for the plurality of antennas; and
determine whether to change from the selected precoding vector to another precoding vector, based on the measured downlink characteristics and the uplink feedback information.

13. The user equipment according to claim 12, wherein the user equipment is configured to measure the downlink characteristics by measuring a received power for each of the plurality of antennas, and is configured to:
perform uplink transmission using a first precoding vector as the selected precoding vector;
determine at least one power difference between the first precoding vector and at least one other precoding vector, based on the received powers measured for the plurality of antennas; and
determine whether or not to change from using the first precoding vector for uplink transmission to using a second precoding vector of said at least one other precoding vector for the uplink transmission, based on the determined power difference.

14. The user equipment according to claim 13, wherein the user equipment is configured to change from the first precoding vector to the second precoding vector if a predetermined function, which depends on the determined power difference and uplink feedback information received for the first precoding vector, exceeds a predetermined threshold value.

15. The user equipment according to claim 14, wherein the uplink feedback information comprises received Transmission Power Control, TPC, commands.

16. The user equipment according to claim 13, wherein the user equipment is configured to allow the change from the first precoding vector to the second precoding vector only at certain predefined time instances.

17. The user equipment according to claim 13, wherein the user equipment is configured to measure the downlink characteristics by performing downlink measurements indicative of a rate of change of a downlink channel, and to use the measurements indicative of the rate of change of the downlink channel in the determination of whether or not to change from the first precoding vector to the second precoding vector.

18. The user equipment according to claim 12, wherein the user equipment is configured to apply switched antenna transmit diversity in the uplink transmission and wherein said downlink characteristics comprise received power.

19. The user equipment according to claim 12, wherein the user equipment is configured to apply beamforming in the uplink transmission and wherein said downlink characteristics comprises covariances between signals received on the plurality of antennas.

20. The user equipment according to claim 19, wherein the measured downlink characteristics further comprise received power on each of the plurality of antennas and wherein the user equipment is configured to
use the covariances and measurements of received power on the plurality of antennas to determine average power differences between different precoding vectors and to determine whether to change from the selected precoding vector to another precoding vector based at least in part on the average power differences.

21. The user equipment according to claim 12, wherein the user equipment is configured to perform said measuring of the downlink characteristics when the user equipment receives uplink related signaling, when the user equipment receives downlink traffic, or at specific measurement periods.

22. The user equipment of claim 12, wherein the user equipment is configured to determine whether to change from the selected precoding vector to another precoding vector by evaluating a function that depends on fast fading or short term channel quality as estimated from the uplink feedback information and depends on long term differences in antenna gain for the plurality of antennas, as estimated from the measured downlink characteristics.

* * * * *